United States Patent [19]
Burdick et al.

[11] Patent Number: 5,607,205
[45] Date of Patent: Mar. 4, 1997

[54] OBJECT RESPONSIVE IMPLEMENT CONTROL SYSTEM

[75] Inventors: Jon S. Burdick, Pekin; Robert A. Herold, Peoria; Paul T. Corcoran, Washington; John F. Szentes, Peoria; Adam J. Gudat, Edelstein, all of Ill.

[73] Assignee: Caterpillar Inc., Peoria, Ill.

[21] Appl. No.: 469,556

[22] Filed: Jun. 6, 1995

[51] Int. Cl.$^6$ .................. E01C 23/088; E01C 23/07
[52] U.S. Cl. .................. 299/1.5; 299/39.6; 342/73; 404/84.2
[58] Field of Search ............... 299/1.4, 1.5, 39.2, 299/39.6; 342/73, 74, 76; 404/84.2

[56] References Cited

U.S. PATENT DOCUMENTS

| | | | |
|---|---|---|---|
| 3,811,787 | 5/1974 | Beaty et al. | 404/84.1 |
| 3,879,149 | 4/1975 | Smith et al. | 404/84.1 X |
| 3,907,136 | 9/1975 | Christides et al. | 214/138 |
| 4,029,165 | 6/1977 | Miller et al. | 404/84.2 X |
| 4,213,719 | 7/1980 | Swisher, Jr. | 404/84 |
| 4,600,356 | 7/1986 | Bridges et al. | 414/694 |
| 4,698,634 | 10/1987 | Alongi et al. | 342/22 |
| 4,967,199 | 10/1990 | Gunton et al. | 342/22 |
| 5,092,659 | 3/1992 | Grathoff | 299/39.2 |
| 5,277,799 | 7/1993 | Kimura et al. | 342/22 |
| 5,297,894 | 3/1994 | Yenick | 299/1.5 |
| 5,307,272 | 4/1994 | Butler et al. | 364/424.02 |
| 5,338,102 | 8/1994 | Lent et al. | 299/10 |
| 5,533,790 | 7/1996 | Weiland | 299/1.5 |

FOREIGN PATENT DOCUMENTS

0485189A2  5/1992  European Pat. Off. .

*Primary Examiner*—Frank Tsay
*Attorney, Agent, or Firm*—Alan J. Hickman

[57] ABSTRACT

An automatic object responsive control system for a work implement has a ground penetrating device mounted for sensing subsurface objects, an object detecting device for determining the undesirability of the object, and an implement control system for automatically elevationally raising the implement in response to an undesirable object being located elevationally between the implement and the ground penetrating device. The automatic object responsive control system is particularly suited for use on a geographic surface altering machine.

17 Claims, 4 Drawing Sheets

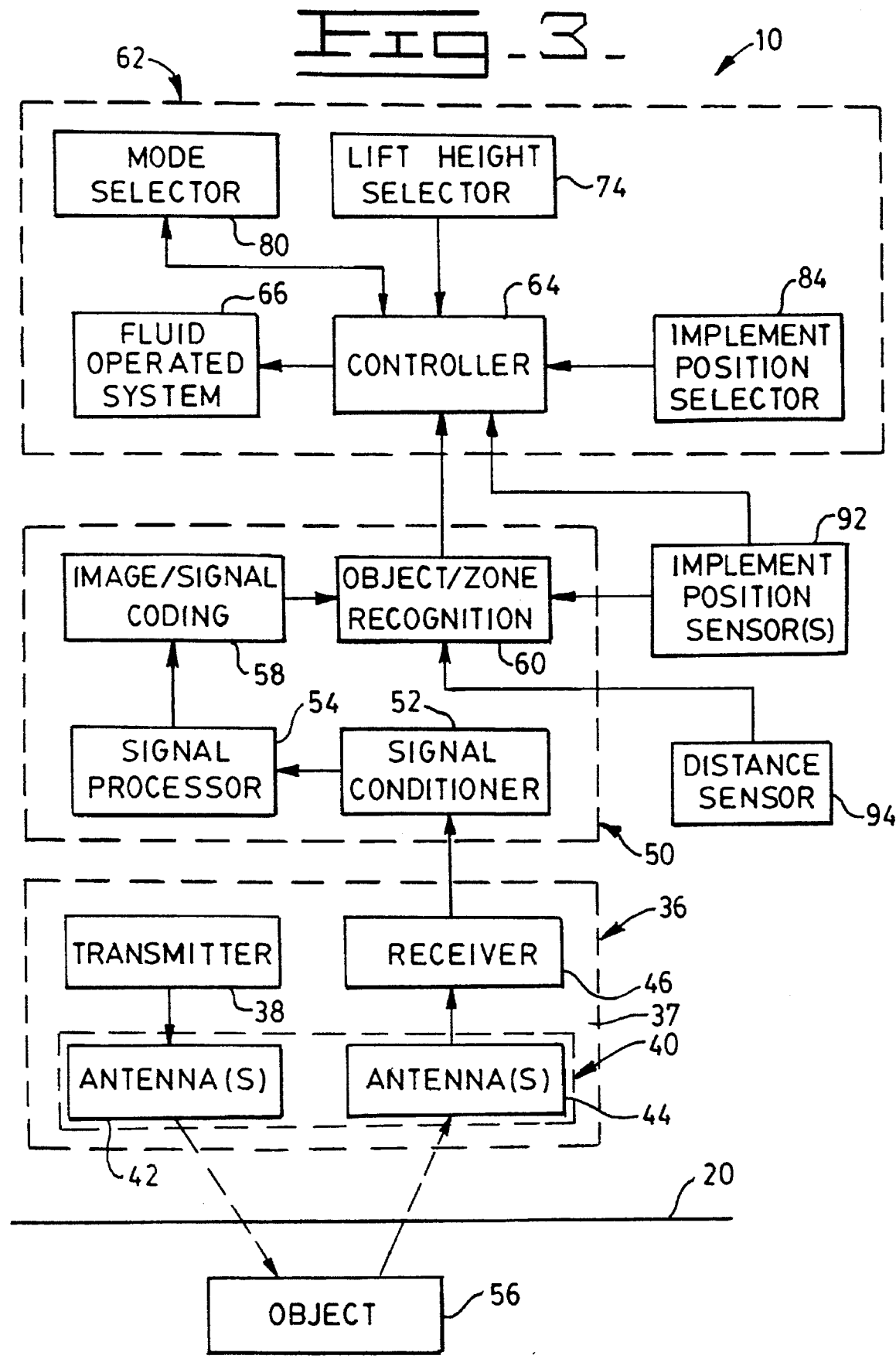

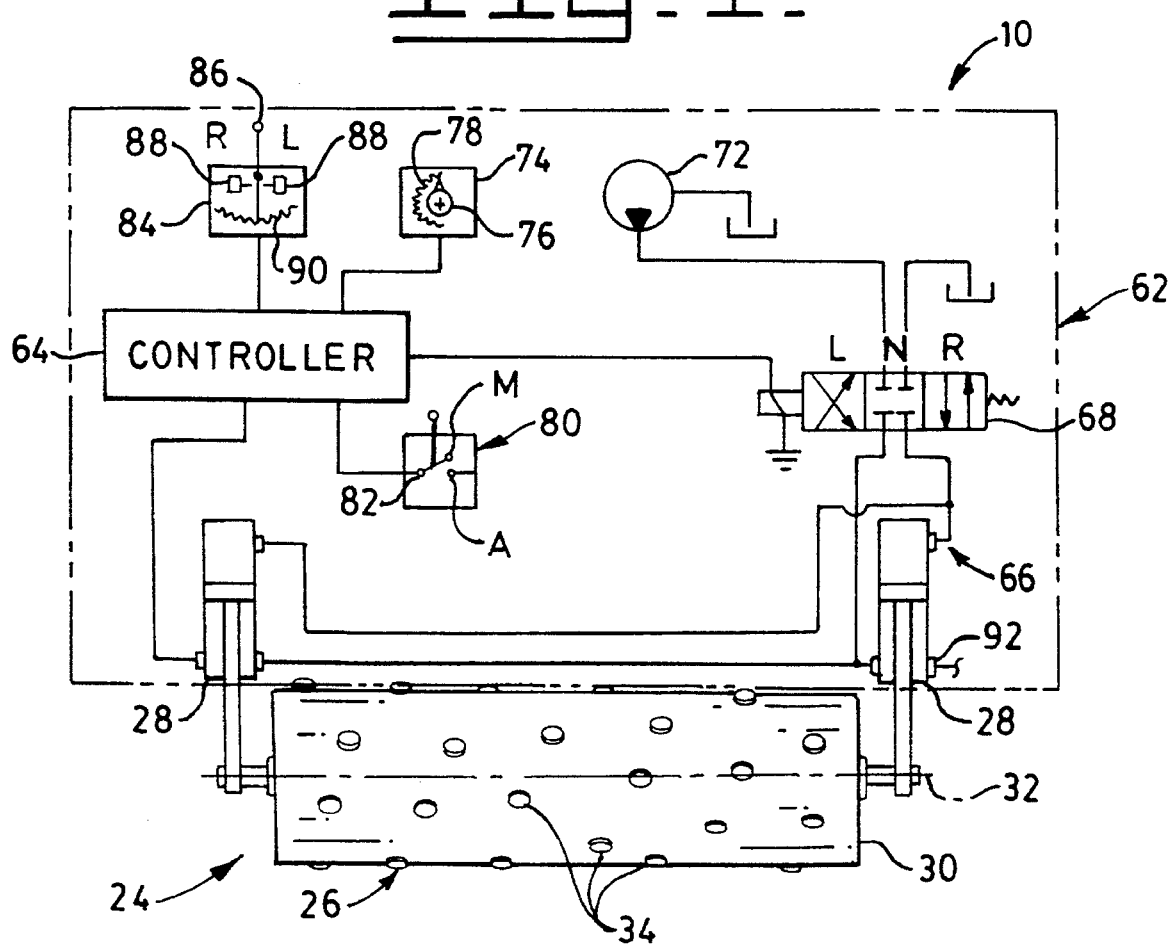

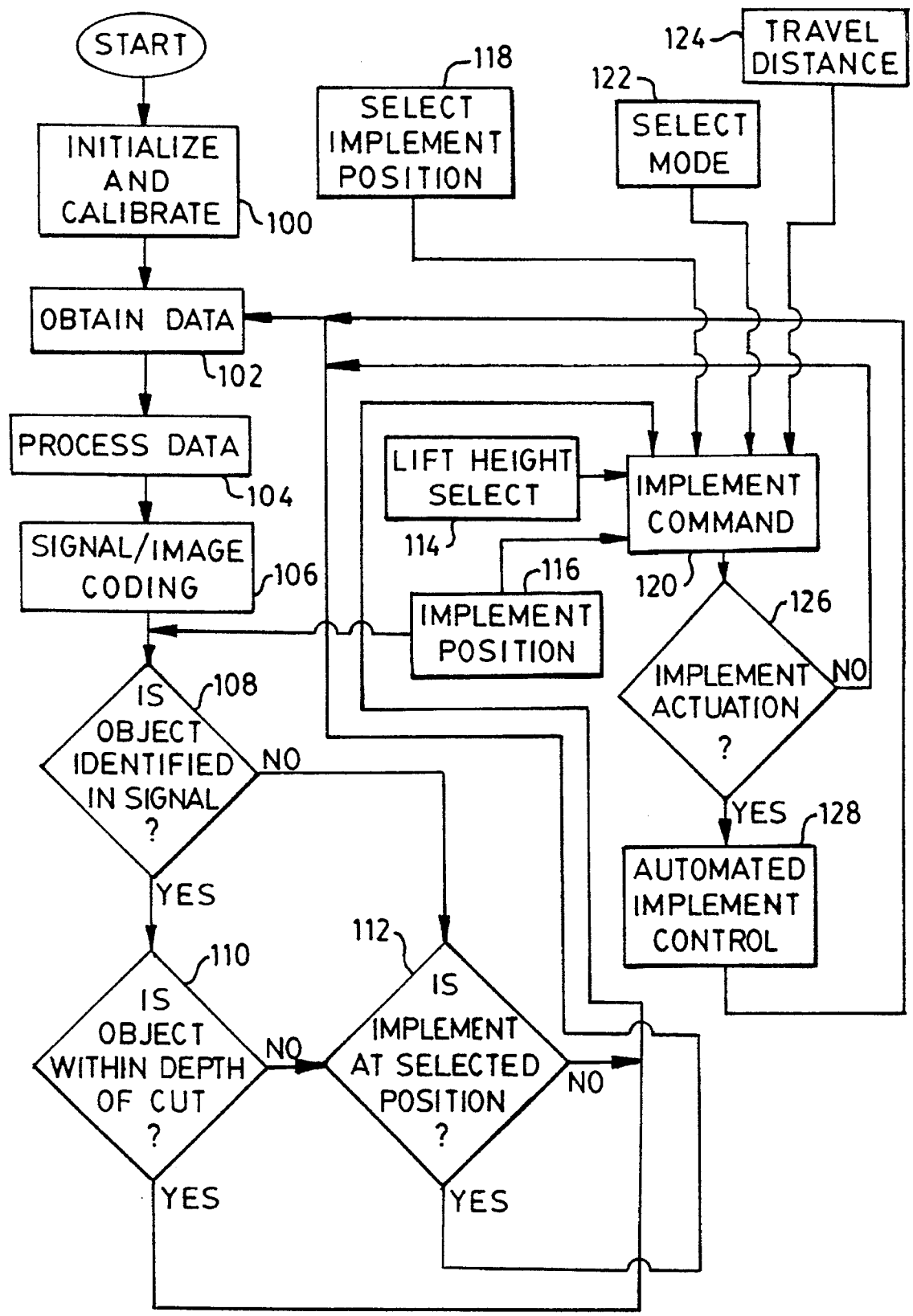
Fig_5_

5,607,205

OBJECT RESPONSIVE IMPLEMENT CONTROL SYSTEM

TECHNICAL FIELD

This invention relates to a work implement control system and more particularly to an automatic object responsive control system for a work implement having a ground penetrating device for sensing the presence of an undesirable object located between a work implement and the ground penetrating device and elevationally moving the work implement to prevent engagement with the undesirable object.

BACKGROUND ART

Devices, such as, ground penetrating radar, metal detectors, to name just a few, have been provided to sense objects buried beneath the surface of the earth. Such devices are normally mounted on a towed or pushed vehicle and moved over the underlying terrain to sense buried objects. Such devices have been used separately or together to improve the accuracy of object sensing. These devices deliver electromagnetic radiation signals and receive a reflection of the signals. Information related to the sensed object, based on signals received, is recorded and analyzed either immediately or at a later date, manually or electronically. The information identifying the object is normally associated with a pulse in a wave form. This information enables the location of the buried object to be marked on the ground surface when excavation or other geographic surface altering operation is to be subsequently performed or to be charted on a subsurface map of buried objects, such as pipes, electrical conduits, steel rod and other subsurface objects for future reference.

Recent developments in hardware and software associated with ground probing radar has improved the speed of ground data signal processing to the point where an object sensed can be displayed or recorded substantially immediately. Also, the accuracy of determining the envelope of the object displayed, based on the processed signals, has improved to the point where even the identity of the object can be manually ascertained.

Geographic surface altering machines, such as, dozers, scrapers, motorgraders, pavement profilers, road reclaimers, just to name a few, operate work in environments in which buried or partially buried objects are present. It is important that such objects are avoided in order that damage to the object or the machine can be prevented.

Attempts to apply ground penetrating object detection technology to geographic surface altering machinery for the purpose of automatically controlling a work implement on the machine has been unsuccessful. One reason for this is that earlier computer technology has not been capable of processing data fast enough to enable a realtime application to implement position control. Further, the physical size of the ground penetrating device has limited the usage to trailer or other mobile carrying vehicles. Recent advancements in the speed of signal processing and the ability to accurately identify subsurface objects has made realtime identification feasible.

The problems of providing a control system that is responsive, accurate, and cost effective is a major concern and has not been demonstrated in the past. Automatic control of the elevational position of a work implement based on an undesirable object being identified in the path of movement of the work implement requires the knowledge of many parameters of operation. Parameters such as, the elevational position of the implement, the rate of travel of the machine, speed of elevational movement of the implement, and the elevational position of the undesirable object relative to the work implement, just to name a few. These parameters along with others must be taken into consideration if automatic control is to be achieved.

The present invention is directed to overcoming one or more of the problems set forth above.

DISCLOSURE OF THE INVENTION

In an aspect of the present invention, an automatic object responsive control system for a work implement of a work machine is provided. The work machine has a frame, a longitudinal axis, a plurality of rotatable members connected to and supporting the frame on a geographic surface, and a prime mover mounted on said machine and drivingly connected to said plurality of rotatable members. A work implement has a cutting portion and is connected to and elevationally movable relative to the frame. The cutting portion extends in a direction transverse the longitudinal axis of the machine. A ground penetrating device, mounted at a preselected location on the frame spaced from the geographic surface underlying the ground penetrating device and spaced a preselected distance from the cutting portion of the work implement in a longitudinal direction relative to the longitudinal axis, delivers electromagnetic radiation, receives a reflection of the delivered electromagnetic radiation, and delivers a responsive first signal. The electromagnetic radiation penetrates an underlying surface. An object detecting device receives the first signal, determines the presence of an undesirable object located elevationally between the ground penetrating device and the cutting portion of the work implement and delivers a responsive raise signal. The implement control means receives the raise signal and lifts said work implement relative to said frame.

BRIEF DESCRIPTION OF THE DRAWINGS

FIG. 3 is a block diagram of the automatic object responsive implement control system of FIG. 2 showing the control system in greater detail.

FIG. 4 is a diagrammatic schematic representation showing the implement control system of FIG. 2 in greater detail.

FIG. 5 is a flow chart disclosing the logic associated with automatic object responsive control of the implement.

BEST MODE FOR CARRYING OUT THE INVENTION

Figure 1:
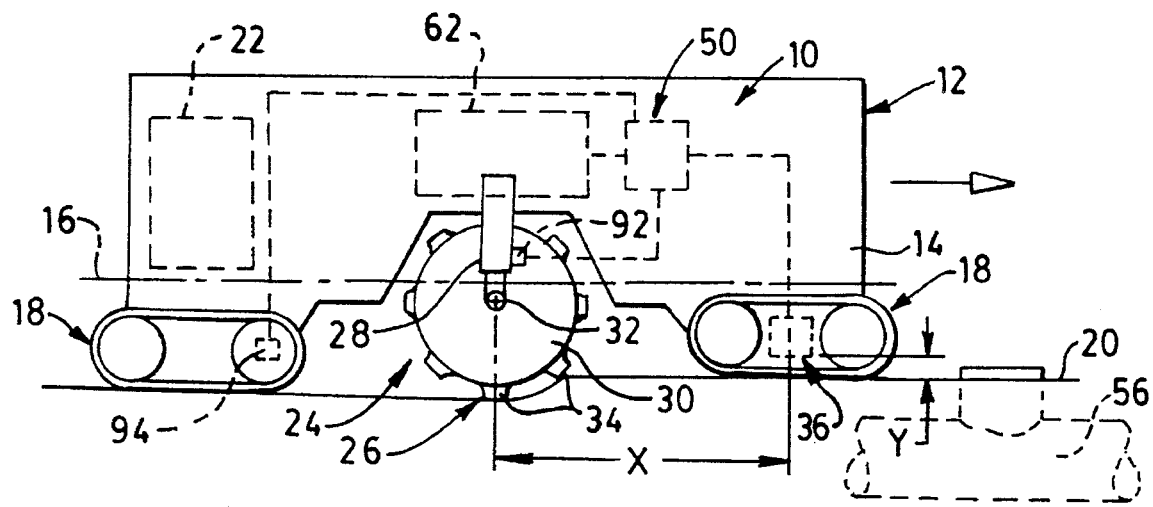
FIG. 1 is a diagrammatic view of a work machine having automatic object responsive implement control system.

With reference to the drawings and particularly to FIG. 1, an automatic object responsive control system 10 for a work implement 24 elevationally movably connected to a work machine 12 is shown. The particular work machine 12 shown is pavement profiler. However, it is to be noted that other work machines, for example, a dozer, a motorgrader, a scraper, a road reclaimer and the like are equivalents and within the scope of this invention. The work machine 12 has a frame 14 of any suitable design, a longitudinal axis 16 extending the length of the frame 14, and a plurality of rotatable members 18 connected to the frame 14 at opposite end portions of the frame 14. The rotatable members 18 are shown as crawler track, however, wheels and other suitable rotatable ground engaging members are considered equivalents and within the spirit of the invention. The rotatable members support the frame 14 on a geographic surface 20. A prime mover 22, such as an internal combustion engine, is mounted on the frame 14 and drivingly connected to the plurality of rotatable members 18 in any suitable and conventional manner, such as by a mechanical, fluid, or hydrostatic transmission (not shown). The prime mover 22 rotates the rotatable members 18 and propels the work machine over the underlying geographic surface 20.

The work implement 24 has a cutting portion 26 and is elevationally movably connected to the frame. A pair of spaced lift jacks 28 connected to the work implement 24 elevationally moves the work implement 24 relative to the frame 14. In the embodiment shown, the work implement 24 is a rotary cylindrical drum 30 having an axis of rotation 32 transversely oriented relative to the longitudinal axis of the frame 14. The cutting portion 26, includes a plurality of teeth 34 connected to the drum 30. The teeth 34 are circumferentially and transversely spaced about the drum 30 and defines a cutting portion 26 extending in a direction transverse the longitudinal axis 16. It is to be noted that any geographic surface altering-work implement 24 having a transverse oriented cutting portion 26 (edge) is a suitable equivalent and within the scope of the invention. For example, dozer blades, scraper bowls, and the like.

The lift jacks 28 are connected to and between the frame 14 and the work implement 24 at transversely spaced apart locations on the frame 14 relative to the longitudinal axis 16. The jacks 28 are fluid operated, telescopic, and actuatable to elevationally move the work implement 24 relative to the frame 14. As shown, the lift jacks 28 are movable between a first position at which the rods of the jacks 28 are retracted and the work implement 24 is elevationally raised toward the frame 14 and a second position at which the rods are extended and the work implement 24 is elevationally lowered away from the frame 14.

Figure 2:
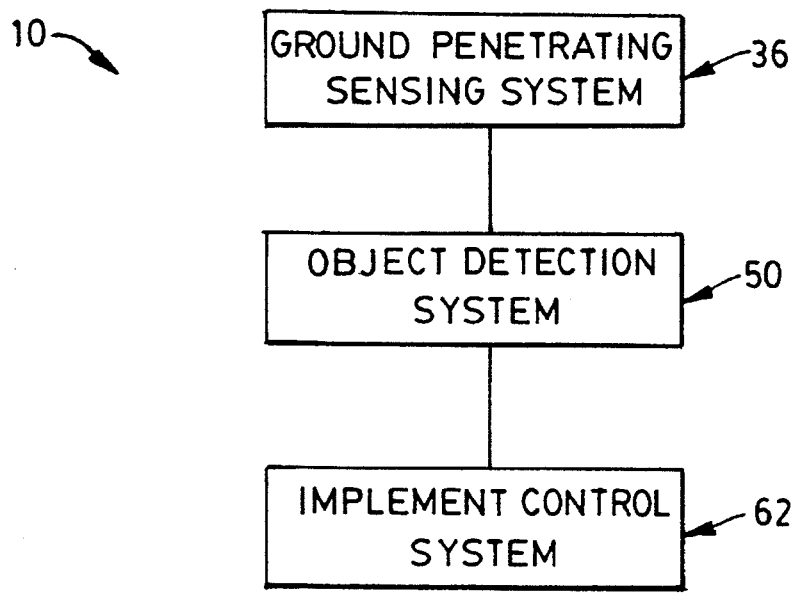
FIG. 2 is a block diagram of the automatic object responsive implement control system.

As seen in FIGS. 1, 2, and 3, a ground penetrating means 36 is provided for delivering electromagnetic radiation, receiving a reflection of said delivered electromagnetic radiation, and delivering a responsive first signal. The ground penetrating means 36 is mounted at a preselected location on the frame 14 spaced from the geographic surface 20 underlying said ground penetrating means 36 a distance "Y", and spaced a preselected distance "X" from the cutting portion of the work implement in a longitudinal direction relative to the longitudinal axis 16. The ground penetrating means 36 is oriented to deliver electromagnetic radiation toward the underlying geographic surface 20 and penetrate the underlying surface a preselected depth. The depth of penetration of the electromagnetic radiation is established as a function of the maximum depth of penetration of the work implements 24. The depth of penetration is controlled by, for example, the intensity or the frequency of the electromagnetic radiation signal produced by the ground penetrating means 36. Factors such as the composition of the geographic surface material, temperature, moisture affect the amount of penetration and are thus considered when the intensity or frequency is selected.

With reference to FIGS. 1, 2 and particularly FIG. 3, the ground penetrating means 36 includes a ground penetrating radar 37 of the land borne type. The ground penetrating radar 37 has a transmitter 38, and a single antenna 40 or an array of antennas 40. Each antenna 40 has an emitting coil 42 connected to the transmitter 38 and a receiving coil 44 connected to a receiver 46. The antenna(s) 40 is connected to the frame 14 and spaced the preselected distance "Y" from the underlying surface 20. Preferably, "Y" is a normal distance from the antenna(s) 40 to a ground contacting portion of the rotatable members 18. The distance selected is based on antenna life, the antenna(s) 40 must be shielded from damage, and antenna signal effectiveness, the antenna(s) must be close enough to the underlying surface 20 to perform satisfactorily. The antenna(s) 40 is also spaced the preselected distance "X" from the cutting portion 26 of the work implement 24 in a longitudinal direction relative to the longitudinal axis 16. This distance is a function of the maximum speed of travel of the work machine 12 and signal processing time required to determine the presence of the sensed undesirable object 56 being located elevationally between the ground penetrating means 36 and the cutting portion 26 of the work implement 24.

The emitting coil 42, based on the signal delivered from the transmitter 38, delivers primary electromagnetic energy and the receiving coil 44 receives secondary electromagnetic energy (returned) from the underlying surface 20 and delivers it to the receiver 46. The receiver 46 receives the secondary electromagnetic energy, amplifies the weak energy waves and delivers a responsive first signal, an analog signal. The number of antennas 40 provided in the array used is a function of the effective length of the work implement 24 which equates to the width of the path that the work machine 12 must traverse and the field of coverage of each antenna 40. The antennas are arranged to extend transversely across the frame 14 relative to the longitudinal axis 16. The preferred antenna 40 is a folded dipole antenna. Alternatively, the antenna(s) may send and receive signals from the same coil by controlling the timing of the transmitted and received signals. Such technology is known to those skilled in the art and considered within the scope of the invention.

It is to be noted that an array of antennas 40 may be replaced by a single antenna 40 which is swept or moved across the frame 14 transversely relative to the longitudinal axis 16.

The ground penetrating means 36 may also include a hybrid system which combines ground penetrating radar 37 with other sensing devices without departing from the invention. For example, metal detectors, magnetometers and other electromagnetic devices may be utilized to improve the accuracy of detection. Such a combination is considered well known to those skilled in the art and will therefore not be discussed in any greater detail.

As best seen in FIG. 3, an object detecting means 50 is connected to the ground penetrating means 36 and receives the first signal delivered by the receiver 46. The object detecting means 50 preferably includes a computer having a processor and memory. A computer of any commercially available type is suitable. However, it is to be noted that a processor composed of discrete components arranged to perform the required functions is considered equivalent and within the scope of the invention. The object detecting means 50 determines the presence of an "undesirable object" 56 located elevationally between the ground penetrating means 36 on the frame and the cutting portion 26 of the work implement 24 and delivers a responsive raise signal. In the context of this invention, an undesirable object 56 is any object that returns a radar signal pulse of a magnitude sufficiently greater than the returned signals closely adjacent the pulse. Objects capable of causing the delivery of such a pulse are, but not limited to, buried pipe of both the metallic and non-metallic variety, cable, electrical wire, fibre-optic cable, reinforcing rod and the like.

The object detecting means 50 includes a computer having a processor, memory and software. A signal conditioner 52 is connected to the receiver 46 and receives the first signal. The signal conditioner 52 is essentially a filter which improves the signal-to noise ratio of the analog first signal in a well known manner. The object detecting means 50 includes a signal processor 54 connected to the signal conditioner 52. The signal processor 54 digitizes the filtered analog first signal and performs other computations to convert the first signal to a more usable format. The converted first signal is processed further by signal/image coding software 58 which looks for anomalies in the processed data that corresponds to an undesirable object 56 (FIG. 1). The object detection system 50 also includes object/zone recognition software 60 that further processes the information, validates the sensed object as being undesirable, and determines whether or not the undesirable object 56 identified in the signal is within the depth of cut of the work implement 24. Stated another way, the object/zone recognition software 60 determines if the undesirable object 56 is elevationally and transversely located in the path of the ground penetrating means 36 and elevationally located between the ground penetrating means 36 and the cutting portion 26 of the work implement 24. Should an unidentified object 56 be at least partially at said location the object detecting means 50 issues a responsive raise signal. Similarly, the object 56 detecting means 50 delivers a lower signal in the absence of sensing an undesirable object and said implement 24 not being at the preselected elevated position (depth of cut).

As best seen in FIGS. 3 and 4, an implement control means 62 is connected to the object detecting means 50 and provided for elevationally controlling movement of the work implement 24 in response to signals from the object detecting means 50. In particular, the implement control means 62 automatically lifts the work implement 24 relative to the frame 14 in response to receiving a raise signal from the object detecting means 50 and automatically lowers the work implement 24 to the preselected elevational position (cutting depth) in response to receiving a lower signal from the object detecting means 50.

The implement control means 62 includes a controller 64 connected to a fluid operated system 66. The controller 64 delivers electrical control signals to the fluid operated system 66 in response to receiving input signals from a variety of devices, including the object detecting means 50. The controller 64 includes a driver circuit of conventional design (not shown) and a signal processor of any appropriate type. The controller is connected to an electrohydraulic control valve 68. The electrohydraulic control valve 68 has a first "R" and second "L" positions and a neutral position "N". The electrohydraulic control valve 68 is connected to and between a pump 72 and the jacks 28 and delivers fluid flow from a pump 72 to the jacks 28 at the "R" and "L" positions and prevents fluid flow from being delivered to the jacks 28 at the neutral position. The jacks 28 extend and lower the work implement 24 when the electrohydraulic control valve 68 is at the "L" position and retract and raise the work implement 24 when the electrohydraulic control valve 68 is at the "R" position. The electrohydraulic control valve 68 is shiftable between the "R" and "L" positions in response to signals delivered from the controller 64.

The implement control means 62 also includes a lift height selector means 74. The lift height selector means 74 is provided for selecting a target height position for the implement 24 relative to the frame 14 and delivering a responsive target lift height signal. The lift height selector means 74 includes a dial indicator 76 having a potentiometer 78. The signal delivered is analog and sets the lift height of the work implement 24 in order to clear a sensed undesirable object 56. It is to be noted that a digital selecting device such as an encoder is a suitable replacement and within the scope of the invention. The lift height selector means 74 is connected to the controller 64 and delivers the target lift height thereto. It should be noted that the lift height selector means 74 is optional and provided when the object/zone recognition software 60 does not have the capability of accurately determining the elevational position of the undesirable object 56 relative to the elevational position of the work implement 24 and determine the target position automatically in software or hardware of the work implement 24.

The implement control means 62 further includes a mode selector means 80 connected to the controller 64. The mode selector means 80 includes a switch 82 having an automatic mode position "A" and a manual mode position "M" and being selectively manually movable therebetween. The switch 82 at the automatic mode position "A" delivers an automatic mode signal to the controller 64 to enable automatic operation of the fluid operated system 66 and at the manual mode position "M" delivers a manual mode signal to the controller 64 so that only manual work implement 24 positioning is permissible. The controller 64, based on preprogrammed instructions, responds to the manual "M" and automatic "A" signals and delivers only the appropriate ones of the automatic and manual control related signals. Automatic positioning of the work implement 24 based on detection of an undesirable object 56 is only possible in the automatic mode of operation.

The implement control means 62 also includes an implement position selector means 84 for selecting the elevational position of the work implement 24 relative to the frame 14 and controlling the depth of cut of the work implement 24 relative to the underlying geographic surface 20. The implement position selector means 84 is connected to the controller 64 and delivers selector signals thereto. The implement position selector means 84 includes a pivotal manually movable control lever 86, a pair of switches 88, and a potentiometer 90. The lever 86 actuates a selective one of the switches 88 and the position of the potentiometer 90. The switches 88 determine the direction of movement of the work implement 24 and the potentiometer 90 determine the rate of elevational movement of the work implement. The controller responds to the signals delivered from the implement position selector means 84 and delivers appropriate control signals to shift the electrohydraulic control valve 68 toward the selected one of the "R" and "L" positions. Because the electrohydraulic control valve 68 is infinitely variable the rate of flow delivered to the jacks 28 is proportional to the lever 86 position, potentiometer 90 position. The implement position selector means 84 is effective for manual control of the work implement when the mode selector means 80 is at the manual position "M".

An implement position sensor means 92 senses the elevational position of the cutting portion 26 of the work implement 24 relative to the frame 14 and delivers a responsive elevational position signal. The implement position sensor means 92 is connected to deliver elevational position signals to the object detection means 50 and the implement control means 62. The implement position sensor means 92 is connected to a jack 28 and senses the amount of extension of the jack 28. Given the geometry and dimensions of the work implement 24 the position of the cutting portion 26 relative to the frame 14 is easily determined. This position information is utilized by the object detection means 50 and the implement control means 62 during the processing of the various signals and for purposes of comparison and calculations. The implement position sensor means 92 includes any one of the many well known types of linear transducers. For example, a yoyo, an encoder, an LVDT, a RF sensor and the like.

A distance means 94 is provided for sensing the distance of travel of the machine 12 and deliver a responsive distance signal. The distance means 94 is connected to the frame 14 and delivers a distance signal to the object detection system 50. The object detection system 50 utilizes the distance signal to calculate when the machine 12 has passed the undesirable object 56 and the work implement 24 is clear to be elevationally lowered to a preselected cutting depth. The distance means 94 is preferably a doppler radar type sensor. However, other sensors such as a resolver and the like are considered within the scope of the invention. It is to be noted that the distance means 94 may be eliminated on work machines 12 that operate at a substantially constant speed of travel. In such situations, the time of travel is used to determine when lowering of the work implement 24 takes place. The time is measured from when the ground penetrating means 36 no longer senses the undesirable object 56.

Industrial Applicability

In operation and with reference to the drawings, particularly FIG. 5, the logic associated with automatic object responsive control of the work implement 24 of the work machine 12 as carried out by the hardware and software of the ground penetrating means 36, object detecting means 50, and implement control means 62 is disclosed in substantial detail. In order to operate the automatic object responsive control system 10 the work machine operator must first initialize and calibrate the system.

As shown in box 100, initialization and calibration is achieved for example, by switching the electrical system mode selector means 80 to the automatic mode "A" and by adjusting the ground penetrating means 36 to a desired depth of penetration. Adjustments of this type are a function of the particular ground penetrating means 36 used. Such adjustments compensate for different ground types, moisture content and other conditions that affect the accuracy of operation. This calibration usually involves adjusting the frequency of the signal delivered toward the underlying surface 20. Such calibration is well known to those skilled in the operation of ground penetrating radar and the like and will therefor not be discussed in any greater detail.

Boxes 102–110 deal with object processing which includes coding, identifying and locating. As shown in box 102, the ground returned first signal delivered from the ground penetrating means 36 is amplified, converted to processable strings of gray scales and recorded for further processing. As indicated in box 104, the data is further processed. This includes digitizing the first signal and converting the data to a more usable format. As indicated in box 106, the converted first signal is processed further by signal/image coding software 58. This software looks for anomalies in the processed data that corresponds to an undesirable object 56. As indicated in decision box 108, the object/zone recognition software 60 further processes the information and validates that the sensed object is undesirable. If the object is not classified as being undesirable, the test of decision box 112 is performed.

The test in decision box 112 relates to checking the elevational position of the work implement 24 and determining if the work implement 24 is at the preselected target raised position. This test is necessary when an undesirable object 56 is not identified and also when an identified undesirable object 56 is not elevationally located between the cutting portion 26 and the ground penetrating means 36. In either case the work implement 24 is permitted to be at the preselected depth of cut as established by the implement position selector 84. The test of box 112, in one situation assumes that the ground penetrating means 36 has passed the undesirable object 56 and the work implement 24 is to be returned to a preselected elevational position relative to the frame 14 (cutting depth position). The test compares the sensed elevational implement position of box 116 with the selected lift height of box 114 and when there is a match the implement control means 62 is issued a command by the object detection means 50 to lower the work implement 24 to the preselected elevational cutting depth position. The implement position sensor means 92 and the lift height selector means 74 provide the necessary position signal input for comparison purposes so that the work implement 24 can be returned to the preselected elevational depth of cut position. When the work implement reaches the preselected cutting depth position the object detection means 50 delivers a implement stop signal and the implement control means 62 responsively shifts the electrohydraulic control valve to the neutral position "N".

If an undesirable object 56 is identified in decision box 108, the test of decision box 110 is performed, determining if the object is within the preselected elevational position of the work implement 24, within the depth of cut of the work implement 24. If the answer is no, the test of decision box 112 is performed, as above. If the test result is yes, an implement raise signal is delivered to the implement control means 62. The implement control means 62 responds to and elevationally raises the work implement 24 to the selected lift height of box 114, as determined by lift height selector means 74.

Specifically, the object detection means 50 receives the elevational position signal, determines the elevational position of the undesirable object 56 relative to the frame 14, compares the elevational position of the cutting portion of the work implement 24 to the elevational position of the undesirable object relative to the frame 14 and delivers a work implement raise signal in response to at least a portion of the undesirable object 56 being located elevationally between the cutting portion 26 of the work implement 24 and the ground penetrating means 36.

It is to be recognized that the object detecting means 50 may be provided with software capable of accurately determing the elevational position of the cutting portion 26 of the work implement 24 relative to the undesirable object using appropriate imaging software and fundamental position comparison logic. In such cases the lift height selector means 74 may be eliminated as the implement control means 62 will be delivered a stop command when the undesirable object 56 is elevationally cleared by the work implement 24.

The object detection means 50 delivers a work implement stop signal in response to the absence of the undesirable object 56 being elevationally located between the cutting portion 26 of the work implement 24 and the ground penetrating means 36. The implement control means 62 responds to this signal and stops elevational movement of the work implement 24. Alternatively, the implement control means 62 may be configured to stop elevational movement of the work implement in response to the absence of receiving an implement raise signal from the object detecting means 50.

The implement commands carried out by the implement control means 62, as previously discussed, are associated with and indicated in box 120, 126 and 128. The selected lift -height (box 114), selected implement position (box 118), selected mode (box 122) and travel distance (box 124) signals from the various devices discussed above are delivered to the implement command box 120. The implement control means 62 processes these signals and the signals delivered from the object detecting means 50 and controls the position of the work implement 24 based on the signals and preprogrammed instruction. As indicated by box 126, implement actuation takes place when certain conditions are met. If the selected mode is manual, ("M") implement actuation will not take place. The implement controller 64 enables automatic implement 24 positioning only when an automatic mode signal is received. Also, if the distance traveled from the last sensed undesirable object 56 is not great enough to prevent contact between the undesirable object 56 and the work implement 24 implement actuation will not take place. In this regard, the controller compares the calculated distance traveled since an undesirable object 56 was sensed and delivers a lower command only when the implement 24 is clear from object contact. Also, if the comparative positions between implement 24, selected lift height and selected implement position are met actuation will not take place, as discussed above.

Information from the implement control means 62, such as the selected implement position and the selected lift height is fed back to update the data recorded in the object detecting means 50 (box 102). This information is utilized during subsequent automatic implement positioning.

Other aspects, objects and advantages of the present invention can be obtained from a study of the drawings, the disclosure and the appended claims.

We claim:

1. An automatic object responsive control system for controlling a work implement of a work machine having a frame, a longitudinal axis, a plurality of rotatable members connected to and supporting the frame on a geographic surface, a prime mover mounted on the work machine and drivingly connected to said plurality of rotatable members, said prime mover propelling the work machine over the geographic surface, comprising:

a work implement having a cutting portion and being elevationally movably connected to the frame, said cutting portion extending in a direction transverse the longitudinal axis of the machine;

ground penetrating means for delivering electromagnetic radiation, receiving a reflection of said delivered electromagnetic radiation, and delivering a responsive first signal, said electromagnetic radiation penetrating an underlying geographic surface, said ground penetrating means being mounted at a preselected location on said frame, spaced from the geographic surface underlying said ground penetrating means, and spaced a preselected distance from the cutting portion of the work implement in a longitudinal direction relative to the longitudinal axis;

object detecting means for receiving said first signal, determining the presence of an undesirable object located elevationally between the ground penetrating means on said frame and the cutting portion of said work implement and delivering a responsive raise signal;

implement control means for receiving said raise signal and lifting said work implement relative to said frame.

2. An automatic object responsive control system, as set forth in claim 1, including lift height sensor means for sensing the elevational position of the cutting portion of the work implement relative to the frame and delivering a responsive elevational position signal, said object detection means receiving the elevational position signal, determining an elevational position of the undesirable object relative to the frame, comparing the elevational position of the cutting portion of the implement to the elevational position of the undesirable object relative to the frame, and delivering a work implement raise signal in response to at least a portion of the undesirable object being located elevationally between the cutting portion of the work implement and the ground penetrating means.

3. An automatic object responsive control system, as set forth in claim 2, wherein said object detection means delivering a work implement stop signal in response to an absence of the undesirable object being elevationally located between the cutting portion of the work implement and the ground penetrating means, said implement control means receiving said work implement stop signal and stopping elevational movement of the work implement in response to receiving said work implement stop signal.

4. An automatic object responsive control system, as set forth in claim 2, wherein said object detection means stopping delivery of said work implement raise signal in response to an absence of the undesirable object being elevationally located between the cutting portion of the work implement and the ground penetrating means, said implement control means stopping elevational movement of said work implement in the absence of receiving said work implement raise signal.

5. An automatic object responsive control system, as set forth in claim 1, including:

lift height sensor means for sensing the elevatonal position of the cutting portion of the work implement relative to the frame and delivering a responsive elevational position signal, lift height selector means for selecting a target lift height position of the implement relative to the frame and delivering a target lift height signal, said implement control means receiving said target lift height signal and said elevational position signal and stopping elevational movement of said work implement relative to said frame in response to the cutting portion of the implement being at the target lift height.

6. An automatic object responsive control system, as set forth in claim 1, including mode selector means for selecting one of an "automatic" and a "manual" mode of operation of the implement control means and delivering a responsive mode signal, said implement control means receiving said mode signal and enabling said implement control means to automatically lift said work implement at the "automatic" mode of operation, and disabling said implement control means from automatically lifting the work implement at the "manual" mode of operation.

7. An automatic object responsive control system, as set forth in claim 1, including an implement position selector means for selecting the elevational position of the implement relative to the frame and controlling the depth of cut of the implement relative to the underlying geographic surface.

8. An automatic object responsive control system, as set forth in claim 1, wherein said ground penetrating means includes a ground penetrating radar connected to said frame at said predetermined location.

9. An automatic object responsive control system, as set forth in claim 8, wherein said ground penetrating radar includes an array of folded dipole antennas connected to the frame at said predetermined location, said antenna array being oriented transverse the longitudinal axis.

10. An automatic object responsive control system, as set forth in claim 8, wherein said ground penetrating means includes a magnetometer.

11. An automatic object responsive control system, as set forth in claim 1, wherein said preselected spaced distance of the ground penetrating means from the cutting portion is determined as a function of a maximum speed of travel of the work machine and a time required to determine the presence of the undesirable object located elevationally between the ground penetrating and the cutting portion of said work implement.

12. An automatic object responsive control system, as set forth in claim 2, wherein said object detecting means includes a processor means for validating a sensed object as being undesirable.

13. An automatic object responsive control system, as set forth in claim 1, wherein said object detecting means delivering an implement lower signal in response to sensing a change in the presence of said undesirable object being located at an elevational location between the ground penetrating means and the cutting portion of said work implement, and the cutting portion of the work implement being elevationally spaced from a preselected geographic surface altering elevational position, said implement control means receiving said implement lower signal and elevationally returning said implement to the preselected geographic surfacing altering elevational position.

14. An automatic object responsive control system, as set forth in claim 1, including distance means for sensing a distance of travel of said machine and delivering a responsive distance signal;

said object detecting means receiving said distance signal and delivering an implement lower signal in response to sensing a change in the presence of said undesirable object being located at an elevational location between the ground penetrating means and the cutting portion of said work implement, the cutting portion of the work implement being elevationally spaced from a preselected geographic surface altering elevational position, and the distance of travel of the machine from a location at which the sensed change in the presence of the undesirable object is equal to a preselected minimum value;

said implement control means receiving said implement lower signal and elevationally returning said implement to the preselected geographic surfacing altering elevational position.

15. An automatic object responsive control system, as set forth in claim 1, wherein said object detection means delivering an implement lower signal in response to sensing a change in the presence of an undesirable object being located elevationally between the ground penetrating means and the cutting portion of said work implement, a preselected amount of lapsed time subsequent to the change in the presence of the undesirable object being sensed, and the cutting portion of the work implement being elevationally spaced from a preselected geographic surface altering elevational position, said implement control means receiving said implement lower signal and elevationally returning said implement to the preselected geographic surfacing altering elevational position.

16. An automatic object responsive control system, as set forth in claim 1, wherein said implement control means includes:

a mode selector means having a "automatic" mode position and a "manual" mode position and being selectively movable therebetween, said mode selector means delivering an automatic mode signal at the "automatic" position and a manual mode signal at the "manual" position;

a controller connected to said object detection means and said mode selector means, said controller delivering a valve position signal in response to receiving an automatic mode signal and said raise signal;

an electrohydraulic control valve having first and second fluid passing positions and being movable between said first and second fluid passing positions, said electrohydraulic valve being connected to said controller and movable to said first fluid passing position in response to receiving said valve position signal;

a lift jack connected to said electrohydraulic valve and movable between first and second spaced apart positions, said lift jack being movable toward said first position in response to said electrohydraulic valve being at said first fluid passing position.

17. An automatic object responsive control system, as set forth in claim 16, wherein said electrohydraulic control valve having a neutral position at which fluid flow is blocked from passing to said lift jack, said implement control means including:

lift height selector means for selecting a target lift height position of the implement relative to the frame and delivering a responsive target lift height signal, said lift height selector being connected to the implement controller;

a lift height sensor connected to said lift jack and said controller, said lift height sensor sensing the location of the lift jack between the first and second lift jack positions and delivering a responsive elevation position signal;

said controller receiving said target lift height and elevation position signals, comparing the target lift height and elevation position signals, and shifting said electrohydraulic control valve to the neutral position and stopping elevational movement of the implement in response to the target lift height and elevational position being equivalent.

* * * * *